(12) United States Patent
Chou et al.

(10) Patent No.: US 12,347,193 B2
(45) Date of Patent: Jul. 1, 2025

(54) DYNAMIC IMAGE PROCESSING METHOD, ELECTRONIC DEVICE, AND TERMINAL DEVICE AND MOBILE COMMUNICATION DEVICE CONNECTED THERETO

(71) Applicant: COMPAL ELECTRONICS, INC., Taipei (TW)

(72) Inventors: Pin-Yu Chou, Taipei (TW); Yu-Ning Chang, Taipei (TW); Yueh-Hua Lee, Taipei (TW); Ming-Hsien Wu, Taipei (TW); Yu-Syuan Huang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 352 days.

(21) Appl. No.: 17/894,183

(22) Filed: Aug. 24, 2022

(65) Prior Publication Data

US 2023/0394822 A1 Dec. 7, 2023

(30) Foreign Application Priority Data

Jun. 6, 2022 (TW) .................................. 111120905

(51) Int. Cl.
*G06V 20/40* (2022.01)
*G06V 10/70* (2022.01)
*G06V 40/16* (2022.01)
*G11B 27/031* (2006.01)
*G11B 27/34* (2006.01)
*H04N 5/77* (2006.01)

(52) U.S. Cl.
CPC .............. *G06V 20/41* (2022.01); *G06V 10/70* (2022.01); *G06V 20/46* (2022.01); *G06V 40/161* (2022.01); *G11B 27/031* (2013.01); *G11B 27/34* (2013.01); *G06V 40/174* (2022.01); *H04N 5/77* (2013.01)

(58) Field of Classification Search
CPC ........ G06V 20/41; G06V 10/70; G06V 20/46; G06V 40/161; G06V 40/174; G11B 27/031; G11B 27/34; H04N 5/77
See application file for complete search history.

(56) References Cited

U.S. PATENT DOCUMENTS

2007/0124679 A1* 5/2007 Jeong ................... G06F 16/7844
725/135
2009/0066803 A1* 3/2009 Miyata ................. H04N 23/611
348/222.1

(Continued)

FOREIGN PATENT DOCUMENTS

JP 5676727 B2 * 2/2015 ......... G06K 9/00221

*Primary Examiner* — Gelek W Topgyal

(57) ABSTRACT

A dynamic image processing method, executed by an electronic device communicating with a photographing device and reading an executable code is introduced. The method includes the steps of identifying the preset object, image filtering and forming a concatenated video. In the step of image filtering, a filter condition is set, the filter condition includes that the preset object appears in a focus area of the initial image, and when the preset object in the initial image meets the filter condition, a catch moment in the initial image is selected. In the step of forming a concatenated video, at least one video clip in the initial image is selected according to the catch moment, and the at least one video clip is assembled to form the concatenated video. An electronic device, a terminal device and a mobile communication device are also introduced.

13 Claims, 11 Drawing Sheets

(56) References Cited

U.S. PATENT DOCUMENTS

| | | | | |
|---|---|---|---|---|
| 2014/0146172 | A1* | 5/2014 | Kajitani | H04N 23/611 |
| | | | | 348/143 |
| 2015/0070525 | A1* | 3/2015 | Rajagopalan | H04N 5/772 |
| | | | | 348/222.1 |
| 2015/0110471 | A1* | 4/2015 | Zheng | G06F 3/005 |
| | | | | 386/291 |
| 2019/0272724 | A1* | 9/2019 | Greene | G08B 21/0205 |
| 2020/0252541 | A1* | 8/2020 | Song | H04N 23/64 |
| 2020/0322539 | A1* | 10/2020 | Kamotani | H04N 23/69 |
| 2021/0105401 | A1* | 4/2021 | Laine | H04N 23/611 |
| 2022/0201221 | A1* | 6/2022 | Ogawa | H04N 23/663 |
| 2022/0394177 | A1* | 12/2022 | Oyachi | H04N 5/2625 |

\* cited by examiner

| Moment Type | View Angle | Environment Sound | Baby in the Scene | Movement Variable | | Person Classification | | Facial Expression | Event |
|---|---|---|---|---|---|---|---|---|---|
| | | dB value | present or not | MLI value | MP value | amount of infants/young children | amount of adults | amount of human faces | |
| Movement (sustained movement) detection of infant/young child | top view/ side view | more than 65dB | present | 45% < MLI < 70% | 10% < MPI < 31% | equal to 1 | 0 | 1 | crying sound detected |
| Movement (real time movement) detection of infant/young child | top view | less than 50dB | present | 45% < MLI < 70% | 0% < MPI < 5% | 1 | 0 | 1 | no crying sound detected |
| Detection of multiple people (one infant and one adult) | top view/ side view | | present | 10% < MLI | | 1 | 0 | 2 | no crying sound detected |
| Detection of multiple people (at least two infants) | side view | more than 65 dB | present | 10% < MLI | 10% < MPI < 31% | 2 or more | 0 | 1 or more | no crying sound detected |
| Detection of multiple people (at least one infant and at least two adults) | side view | less than 65 dB | present | | | 1 or more | 2 or more | 3 or more | |

| Basic information | | | | | | [Body A] score and position | | | | | [Body B] score and position | | | | | [Body C] score and position | | | | | [human face X] score and position | | | | | [human face Y] score and position | | | | | [human face Z] score and position | | | | | amount | | |
|---|---|---|---|---|---|---|---|---|---|---|---|---|---|---|---|---|---|---|---|---|---|---|---|---|---|---|---|---|---|---|---|---|---|---|---|---|---|
| date | time | ML | MPI | db | smile | cry | score | x1 | y1 | x2 | y2 | score | x1 | y1 | x2 | y2 | score | x1 | y1 | x2 | y2 | score | x1 | y1 | x2 | y2 | score | x1 | y1 | x2 | y2 | score | x1 | y1 | x2 | y2 | infant body | adult body | face |
| xxxx/xx/xx | 03:52:13 | 0.15 | 0.3 | 72.74 | 0.93 | 0 | 0.98 | 1461 | 4 | 1896 | 450 | 0.52 | 1203 | 695 | 1497 | 825 | 0 | 0 | 0 | 0 | 0 | 0.65 | 1416 | 29 | 1455 | 96 | 0.58 | 1674 | 9 | 1758 | 78 | 0 | 0 | 0 | 0 | 0 | 1 | 1 | 2 |
| xxxx/xx/xx | 03:52:19 | 0.16 | 0.09 | 72.74 | 0 | 0 | 0.95 | 1437 | 2 | 1878 | 441 | 0.62 | 1356 | 11 | 1560 | 411 | 0 | 0 | 0 | 0 | 0 | 0.62 | 1461 | 22 | 1506 | 76 | 0.6 | 1677 | 9 | 1758 | 78 | 0.29 | 1434 | 36 | 1485 | 103 | 1 | 1 | 3 |
| xxxx/xx/xx | 03:52:21 | 0.25 | 0.11 | 72.74 | 1 | 0 | 0.97 | 1413 | 2 | 1758 | 450 | 0 | 0 | 0 | 0 | 0 | 0.51 | 1200 | 695 | 1494 | 825 | 0.74 | 1452 | 33 | 1491 | 90 | 0.56 | 1650 | 6 | 1707 | 92 | 0 | 0 | 0 | 0 | 0 | 1 | 2 | 2 |
| xxxx/xx/xx | 03:54:33 | 0.2 | 0.17 | 72.74 | 0 | 0 | 0.96 | 1446 | 0 | 1770 | 447 | 0.94 | 1338 | 31 | 1539 | 360 | 0.56 | 1203 | 699 | 1497 | 828 | 0.73 | 1434 | 49 | 1479 | 105 | 0.56 | 1647 | 11 | 1698 | 90 | 0 | 0 | 0 | 0 | 0 | 2 | 0 | 2 |
| xxxx/xx/xx | 03:54:45 | 0.17 | 0.18 | 72.74 | 1 | 0 | 0.97 | 1383 | 4 | 1761 | 452 | 0.51 | 1203 | 697 | 1497 | 825 | 0 | 0 | 0 | 0 | 0 | 0.89 | 1431 | 33 | 1473 | 90 | 0.79 | 1641 | 2 | 1704 | 85 | 0 | 0 | 0 | 0 | 0 | 1 | 1 | 2 |

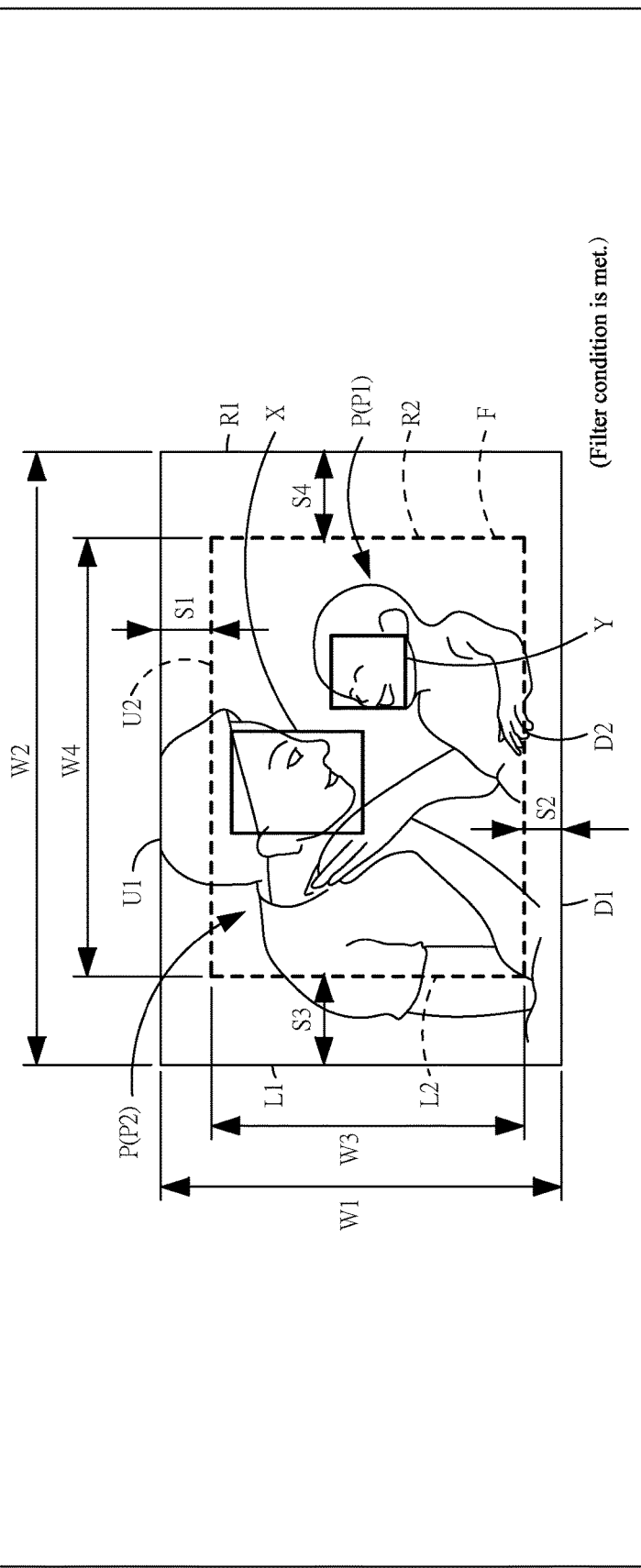

FIG. 8

| Basic information | | | | | | [Body A] score and position | | | | | [Body B] score and position | | | | | [Body C] score and position | | | | | [human face X] score and position | | | | | [human face Y] score and position | | | | | [human face Z] score and position | | | | | amount | | |
|---|---|---|---|---|---|---|---|---|---|---|---|---|---|---|---|---|---|---|---|---|---|---|---|---|---|---|---|---|---|---|---|---|---|---|---|---|---|---|
| date | time | ML | MP | db | smile | cry | score | x1 | y1 | x2 | y2 | score | x1 | y1 | x2 | y2 | score | x1 | y1 | x2 | y2 | score | x1 | y1 | x2 | y2 | score | x1 | y1 | x2 | y2 | score | x1 | y1 | x2 | y2 | infant body | adult body | face |
| xxxx/xx/xx | 03:52:13 | 0.15 | 0.3 | 72.74 | 0.93 | 0 | 0.98 | 1461 | 4 | 1896 | 450 | 0.52 | 1203 | 695 | 1497 | 825 | 0 | 0 | 0 | 0 | 0 | 0.65 | 1416 | 29 | 1455 | 96 | 0.58 | 1674 | 9 | 1758 | 78 | 0 | 0 | 0 | 0 | 0 | 1 | 1 | 2 |
| xxxx/xx/xx | 03:52:19 | 0.16 | 0.09 | 72.74 | 0 | 0 | 0.95 | 1437 | 2 | 1878 | 441 | 0.62 | 1356 | 11 | 1560 | 411 | 0.51 | 1200 | 695 | 1494 | 825 | 0.62 | 1461 | 22 | 1506 | 76 | 0.6 | 1677 | 9 | 1758 | 78 | 0.29 | 1434 | 36 | 1485 | 103 | 1 | 2 | 3 |
| xxxx/xx/xx | 03:52:21 | 0.25 | 0.11 | 72.74 | 1 | 0 | 0.97 | 1413 | 2 | 1758 | 450 | 0 | 0 | 0 | 0 | 0 | 0 | 0 | 0 | 0 | 0 | 0.74 | 1452 | 33 | 1491 | 90 | 0.56 | 1650 | 6 | 1707 | 92 | 0 | 0 | 0 | 0 | 0 | 1 | 0 | 2 |
| xxxx/xx/xx | 03:54:33 | 0.2 | 0.17 | 72.74 | 0 | 0 | 0.96 | 1446 | 0 | 1770 | 447 | 0.94 | 1338 | 31 | 1539 | 360 | 0.56 | 1203 | 699 | 1497 | 828 | 0.73 | 1434 | 49 | 1479 | 105 | 0.56 | 1647 | 11 | 1698 | 90 | 0 | 0 | 0 | 0 | 0 | 2 | 1 | 2 |
| xxxx/xx/xx | 03:54:45 | 0.17 | 0.18 | 72.74 | 1 | 0 | 0.97 | 1383 | 4 | 1761 | 452 | 0.51 | 1203 | 697 | 1497 | 825 | 0 | 0 | 0 | 0 | 0 | 0.89 | 1431 | 33 | 1473 | 90 | 0.79 | 1641 | 2 | 1704 | 85 | 0 | 0 | 0 | 0 | 0 | 1 | 1 | 2 |

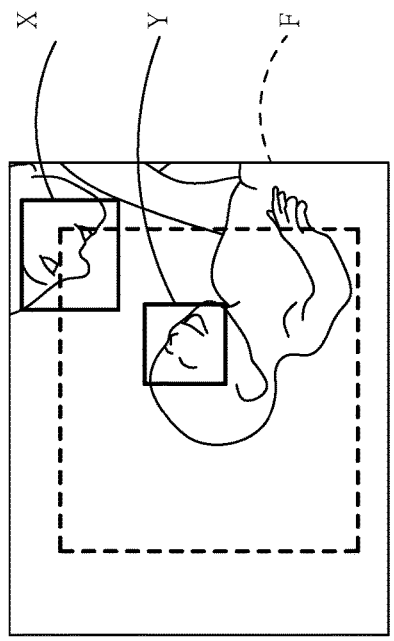

(Filter condition is not met.)

FIG. 9

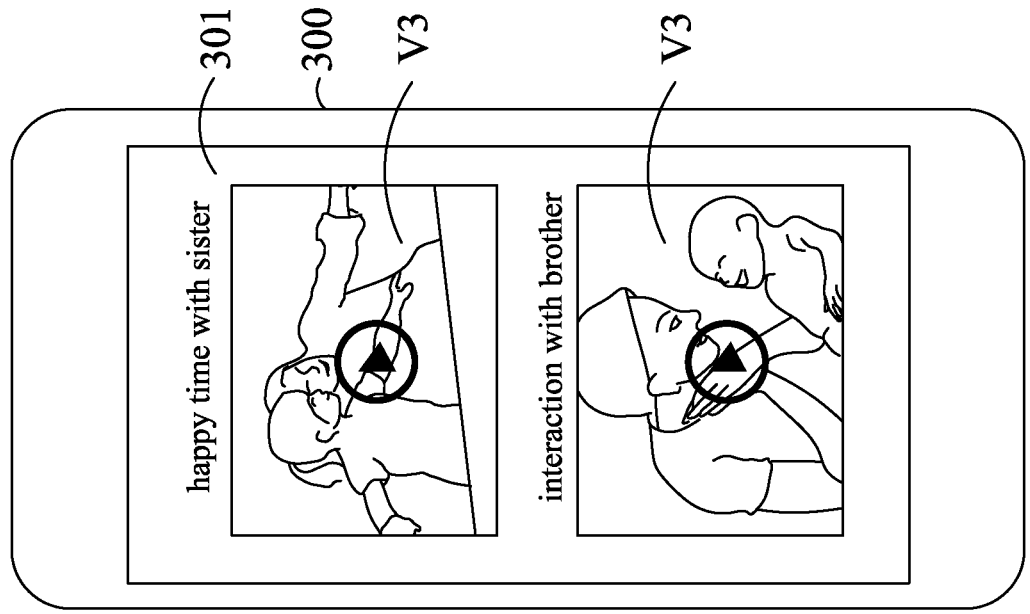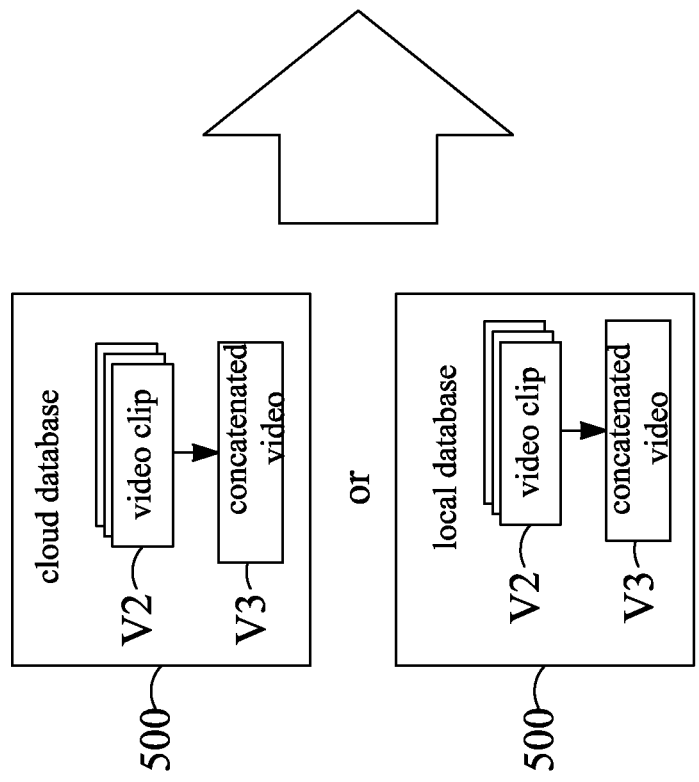
FIG. 11

DYNAMIC IMAGE PROCESSING METHOD, ELECTRONIC DEVICE, AND TERMINAL DEVICE AND MOBILE COMMUNICATION DEVICE CONNECTED THERETO

CROSS-REFERENCE TO RELATED APPLICATION

This non-provisional application claims priority under 35 U.S.C. § 119(a) on Patent Application No(s). 111120905 filed in Taiwan, R.O.C. on Jun. 6, 2022, the entire contents of which are hereby incorporated by reference.

BACKGROUND OF THE INVENTION

1. Field of the Invention

The present disclosure relates to a dynamic image processing technology, and in particular to a dynamic image processing method, an electric device and a terminal device and a mobile communication device connected thereto.

2. Description of the Related Art

In a conventional monitoring system for infants and young children, a camera automatically captures images through artificial intelligence recognition, and conditions for capturing images are mainly based on changes in facial expressions or voices. However, the conventional monitoring system has the following problems:

1. The conventional monitoring systems usually only target infants and young children for image capture. When there are one infant and one adult in the image, the conventional monitoring system usually only takes the change of the infant's facial expression or voice as the conditions for capturing images. At this time, if the capture conditions are met, but the adult's face is at the edge or the corner of the shot, the image will still be selected, but it will absolutely be unsatisfactory.

2. Even though the conventional monitoring system can use the changes of facial expressions or voices as the conditions for capturing images, it cannot sort and filter the level of expressions or voices. For example, smiley faces are chosen with the one who laughs ahead of the one who smiles (or vice versa), and the selection of laughter is given priority to high decibels over low decibels (or vice versa). Similarly, unsatisfactory ones need to be manually removed from these images.

Therefore, the present disclosure provides solutions for solving the above drawbacks.

BRIEF SUMMARY OF THE INVENTION

The present disclosure provides a dynamic image processing method, an electric device and a terminal device and a mobile communication device connected thereto. In the present disclosure, it is a filter condition whether a preset object appears in a focus area of an initial image in order to select an image which meets requirements.

To achieve the above-mentioned purpose, the present disclosure provides a dynamic image processing method, which is executed by an electronic device communicating with a photographing device and reading an executable code to identify a preset object by using artificial intelligence, and perform dynamic image processing for the preset object. The dynamic image processing method includes identifying the preset object, image filtering and forming a concatenated video. In the step of identifying the preset object, the preset object is recognized by artificial intelligence from an initial image captured by the photographing device. In the step of image filtering, a filter condition is set, the filter condition includes that the preset object appears in a focus area of the initial image, and when the preset object in the initial image meets the filter condition, a catch moment in the initial image is selected. In the step of forming a concatenated video, at least one video clip in the initial image is selected according to the catch moment, and the at least one video clip is assembled to form the concatenated video.

In an embodiment, an entire screen of the initial image is a rectangle including a first upper side, a first lower side, a first left side, a first right side, a first width between the first upper side and the first lower side, and a second width between the first left side and the first right side; and the focus area is a rectangular preset area smaller than the entire screen of the initial image, the rectangular preset area includes a second upper side, a second lower side, a second left side, a second right side, a third width between the second upper side and the second lower side, and a fourth width between the second left side and the second right side are, wherein the first width is greater than the third width, and the second width is greater than the fourth width.

In an embodiment, there are an upper space between the first upper side and the second upper side, a lower space between the first lower side and a second lower side, a left space between the first left side and the second left side, and a right space between the first right side and the second right side, wherein the upper space and the lower space are equal or unequal, and the left space and the right space are equal or unequal.

In an embodiment, the preset object is an infant (or a young child), and the filter condition further includes the initial image at least having a face of the infant.

In an embodiment, the filter condition further includes an ambient volume measured from the infant, and the filtering condition further includes that the ambient volume is within a volume range.

In an embodiment, the video clip is selected based on a score of the infant's facial expression at the catch moment, and a highest score is selected; or the video clip is selected based on a face area of the preset object at the catch moment, and a largest face area is selected.

In an embodiment, the preset object includes at least one infant and at least one adult, the filter condition further includes calculating an amount of faces of the infant and the adult and an amount of bodies of the infant and the adult, and the filter condition further includes the amount of the faces of the infant and the adult being not less than the amount of the bodies of the infant and the adult.

In an embodiment, in the step of image filtering, based on the catch moment at which the video clip is selected, similar videos at other catch moments within a predetermined time before and/or after the catch moment are set to be excluded.

In an embodiment, in the step of forming the concatenated video, a start point of the video clip is set at a first time point which is a time period before the catch moment, and/or an end point of the video clip is set at a second time point which is the time period after the catch moment.

The present disclosure provides an electronic device for processing dynamic images, in which the electronic device communicates with a photographing device and a database, the database receives an initial image captured by the photographing device and uses artificial intelligence to identify a preset object, and the electronic device performs dynamic image processing on the preset object. The electronic device includes an intelligent processing unit, electrically connected to the photographing device or the database for reading the initial image and reading and executing an executable code to set a filter condition for selecting a catch moment in the initial image when a threshold is met, wherein the filter condition includes that the preset object appears in a focus area of the initial image, the focus area is smaller than a rectangular preset area of an entire screen of the initial image, and the intelligent processing unit selects at least one video clip according to the catch moment and assembles the at least one video clip to form a concatenated video.

In an embodiment, the database is a local database of the electronic device and/or a cloud database to which the electronic device belongs.

In an embodiment, the preset object at least includes an infant, and the database further includes an intelligent body identification sub-database for identifying a body of the infant, an intelligent face identification sub-database for identifying a face of the infant, an intelligent crying sound identification sub-database for identifying a crying sound of the infant, and/or an intelligent smile identification sub-database for identifying a smile of the infant.

The present disclosure further incudes a terminal device for communicating with the electronic device, wherein the terminal device carries an application program, and the terminal device executes the application program to receive a push broadcast of the concatenated video from the electronic device.

The present disclosure further provides a mobile communication device for communicating with a photographing device and a cloud database, the mobile communication device includes a user interface for displaying at least one concatenated video, the concatenated video is assembled from the at least one video clip stored in the cloud database, the video clip is selected according to a catch moment, the catch moment is selected when the preset object in an initial image meets a filter condition, and the filter condition includes that at least two preset objects simultaneously appear in a focus area in the initial image.

According to the present disclosure, when the preset object appears in a focus area of the initial image, the filter condition is met, and in the generated concatenated video, one or more preset object can be presented in a relatively uniform proportion in the screen, so as to meet the user's expectation.

Further, users can select high or low levels of motion changes, facial expressions and/or voices from the filter conditions according to their personal needs, such that the generated video concatenation can meet the user's expectations.

BRIEF DESCRIPTION OF THE DRAWINGS

FIG. 6 is a schematic view showing relevant data in the background of the electronic device according to an embodiment of the present disclosure.

FIG. 8 is a schematic view showing that the catch moment meets the filter condition according to an embodiment of the present disclosure.

FIG. 9 is a schematic view showing that the catch moment does not meet the filter condition according to an embodiment of the present disclosure.

FIG. 11 is a schematic view showing the concatenated video being pushed to a terminal device according to an embodiment of the present disclosure.

DETAILED DESCRIPTION OF THE INVENTION

Figure 1:
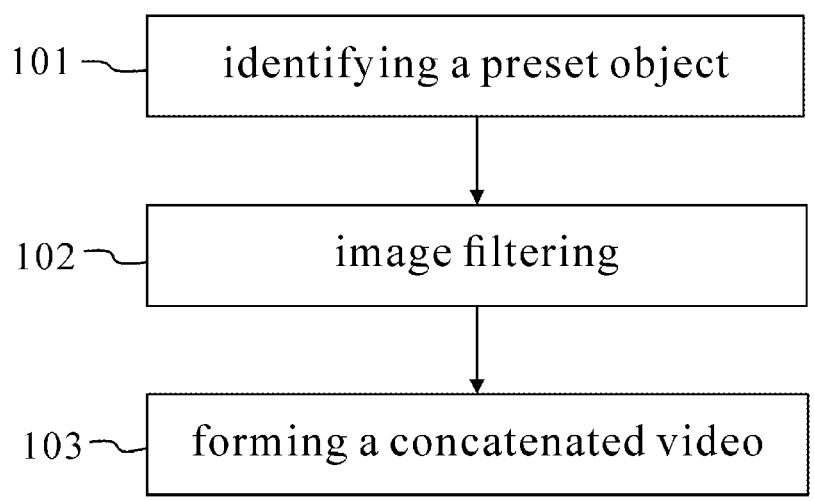
FIG. 1 is a flow chart showing main steps of the processing method according to an embodiment of the present disclosure.

To facilitate understanding of the object, characteristics and effects of this present disclosure, embodiments together with the attached drawings for the detailed description of the present disclosure are provided.

Referring to FIG. 1 to FIG. 11, the present disclosure provides a dynamic image processing method 100, an electronic device 200 and a terminal device 300 connected to the electronic device 200, and a mobile communication device. The processing method 100 includes the step 101 of identifying a preset object, the step 102 of image filtering and the step 103 of concatenating videos. The electronic device 200 includes an intelligent processing unit 10 and a wireless communication unit 20.

Figure 2:
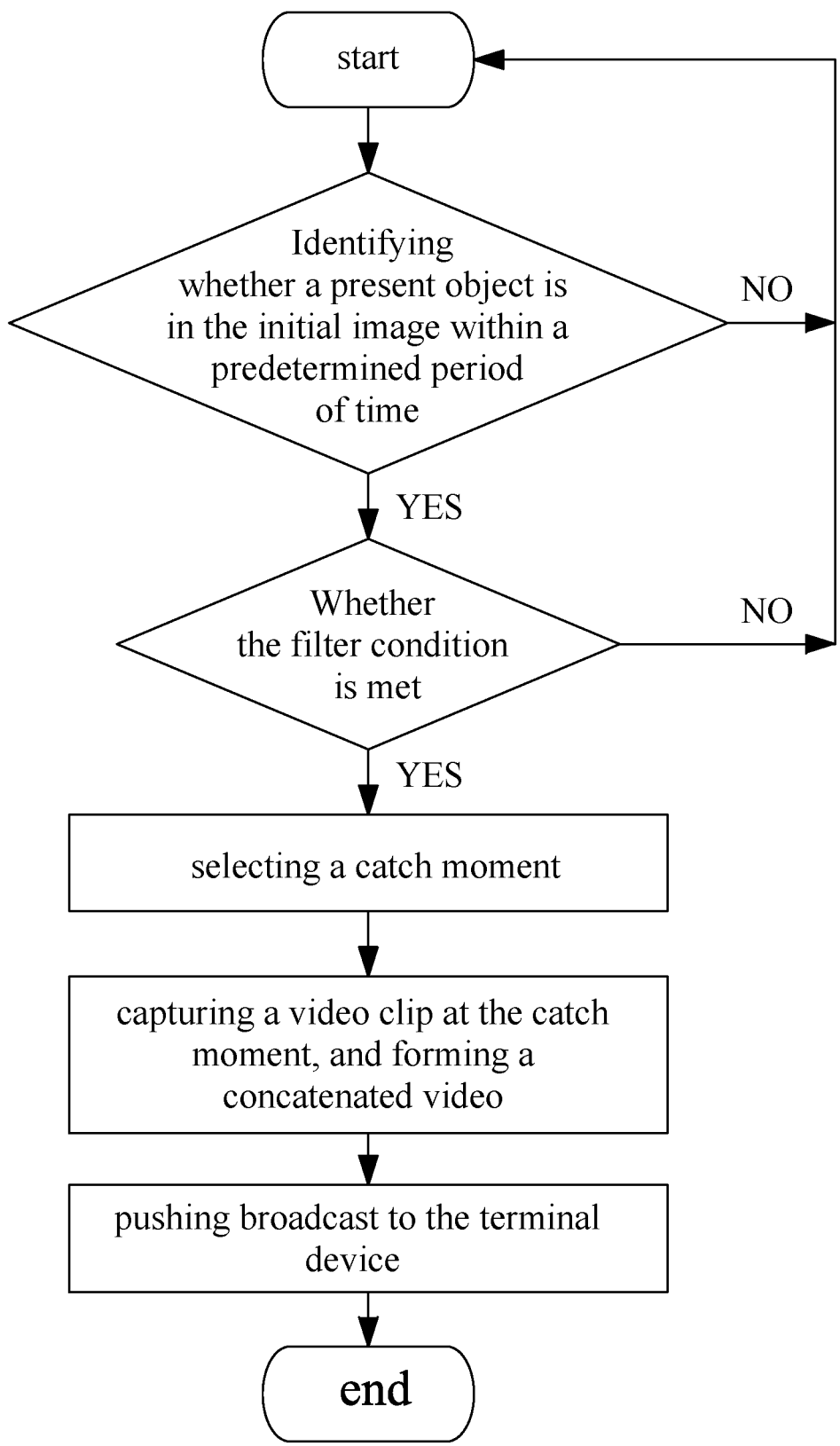
FIG. 2 is a block diagram showing the steps of the processing method according to an embodiment of the present disclosure.

The processing method 100 is executed by the electronic device 200 reading an executable code to identify a preset object P by using artificial intelligence, and perform dynamic image processing for the preset object P, thereby performing the step 101 of identifying a preset object, the step 102 of image filtering and the step 103 of concatenating videos as shown in FIG. 1. Referring to FIG. 2, the step 101 of identifying a preset object is to identify whether there is a preset object in the initial image within a predetermined time; the step 102 of image filtering is to identify whether the filter condition is met, so as to select the catch moment; and the step 103 of concatenating videos is performed on the video clip selected at the catch moment to form a concatenated video. The concatenated video can be pushed to the terminal device 300. If there is a preset object in the initial image within the predetermined time, the determination result is "YES", and when the determine result is "YES" for the question whether that the filter condition is met, the catch moment is selected, the video clip is captured at the catch moment, and the concatenating video is generated and pushed broadcast to the terminal device. If there is no preset object in the initial image within the predetermined time, the determination result is "NO", and when the determine result is "NO" for the question whether that the filter condition is met, it returns to the beginning of the process and re-execute.

Figure 3:
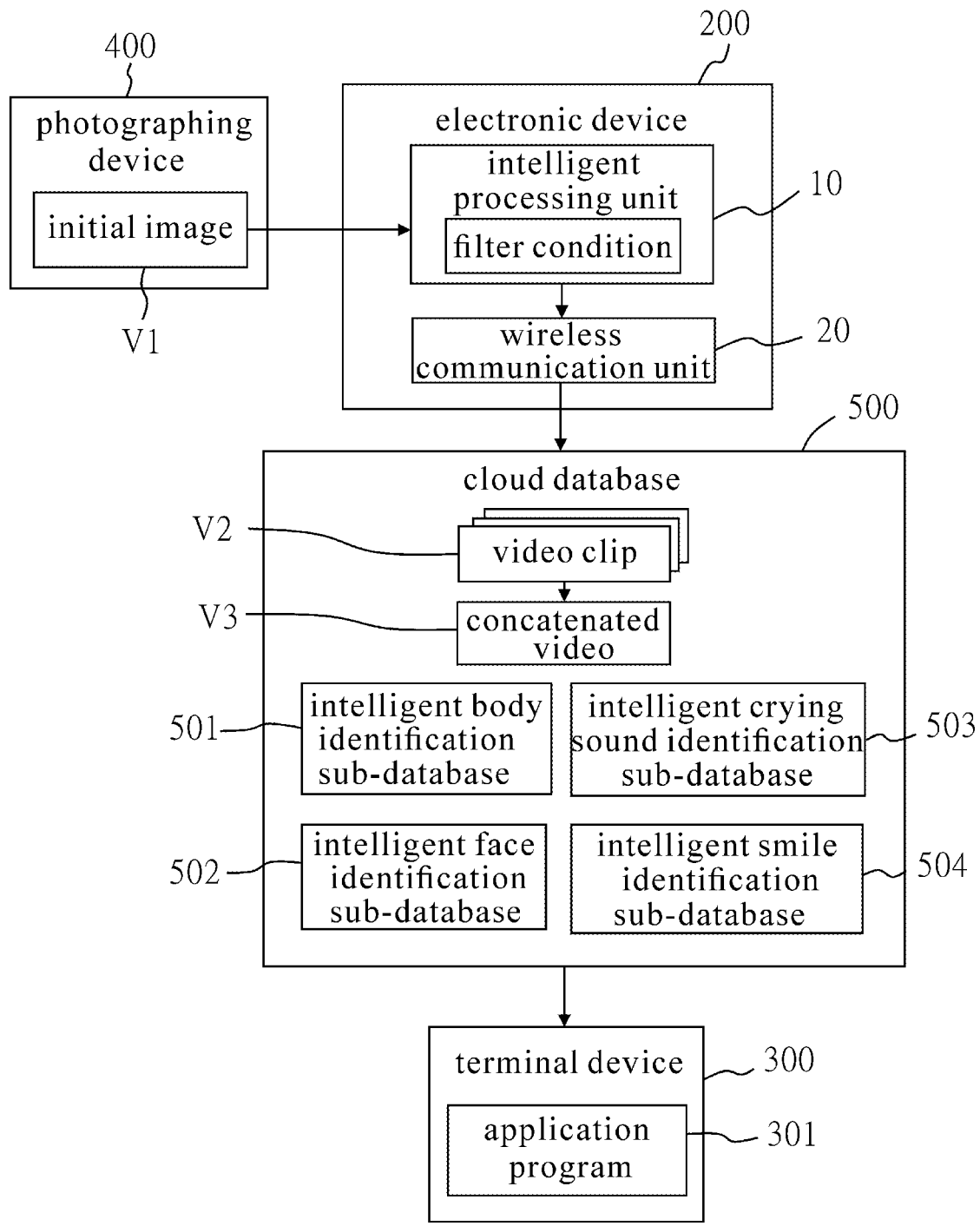
FIG. 3 is a block diagram showing an electronic device according to an embodiment of the present disclosure.
Figure 4:
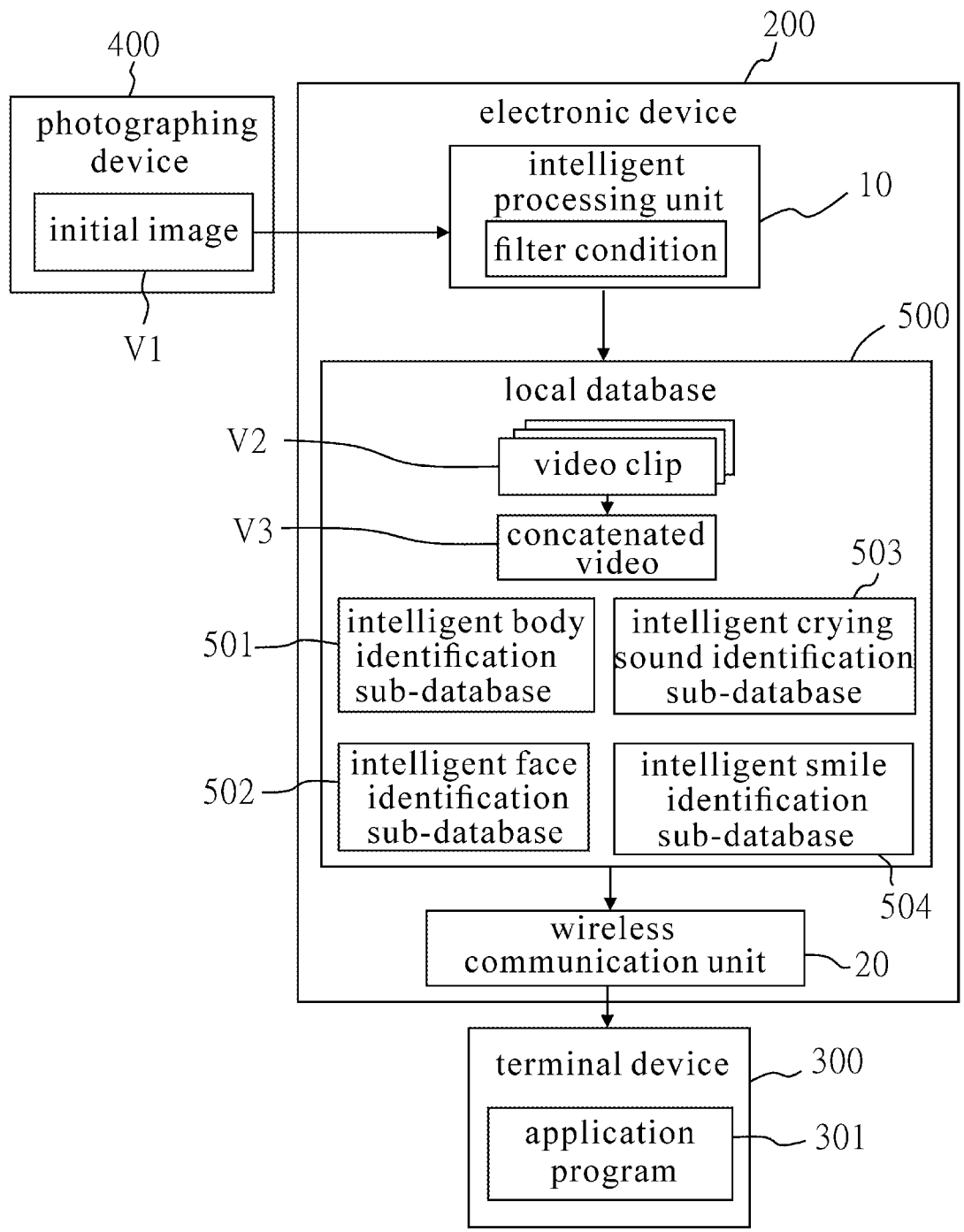
FIG. 4 is a block diagram showing an electronic device according to another embodiment of the present disclosure.

As shown in FIG. 3 and FIG. 4, the electronic device 200 communicates with a photographing device 400 and a database 500. The database 500 receives an initial image V1 captured by the photographing device 400 and uses artificial intelligence to identify a preset object, and the electronic device 200 performs dynamic image processing on the preset object. The intelligent processing unit 10 is electrically connected to the photographing device 300 or the database 500 to read the initial image V1. In this embodiment, the photographing device 400 and the database 500 are external devices and are independent from the electronic device 200. In another implementation, the photographing device 400 and the database 500 may be integrated into the electronic device 200 to be systematized.

In an embodiment, the photographing device 400 is a network camera, and the database 500 is a cloud database (as shown in FIG. 3). After being initialized, the photographing device 400 it can be connected to the database 500 for remote communication via the Internet, and login to capture and store images after the authentication procedure (for example, login account and password) is completed. The database 500 can be the cloud database, a local database (as shown in FIG. 4) of the electronic device 200, or both the local database of the electronic device 200 and the cloud database (not shown).

During performing the processing method 100, in the step 101 of identifying a preset object, the preset object P is recognized by artificial intelligence from an initial image V1 captured by the photographing device 400. Then, the step 102 of image filtering is performed. In an embodiment, the preset object is, but not limited to, at least one infant (or a young child) P1 and at least one adult P2.

After the photographing device 400 is activated, the step 101 of identifying the preset object will cycle for a predetermined time (for example, 30 seconds). If the photographing device 400 identifies the preset object P in the initial image V1 within the predetermined time, then the step 102 of image filtering is performed. If no preset object P is recognized in the initial image V1 in the predetermined time, then the step 101 of identifying the preset object is repeated in the next predetermined time. When no preset object P is identified in the initial image V1 in the predetermined time, the last preset object P identified at the last predetermined time will be compared; however, if no preset object P is identified at the last predetermined time, it is defined as no data. The artificial intelligence recognition is performed, for example, through a neural network (Artificial Neural Network, ANN), but the present disclosure is not limited thereto.

In the step 102 of image filtering, a filter condition is set. The filter condition includes one or more preset objects appearing in a focus area F of the initial image V1, and when the filter condition is met, a catch moment in the initial image V1 is selected.

As shown in FIG. 8, in an embodiment, the entire screen of the initial image V1 is a rectangle including a first upper side U1, a first lower side D1, a first left side L1, a first right side R1, a first width W1 between the first upper side U1 and the first lower side D1, and a second width W2 between the first left side L1 and the first right side R1. In an embodiment, the focus area F is smaller than a rectangular preset area in the entire screen of the initial image V1. The rectangular preset area includes a second upper side U2, a second lower side D2, a second left side L2, a second right side R2, a third width W3 between the second upper side U2 and the second lower side D2, and a fourth width W4 between the second left side L2 and the second right side R2. For example, the first width W1 is equal to the third width W3, and the second width W2 is greater than the fourth width W4; or the first width W1 is greater than the third width W3, and the second width W2 is equal to the fourth width W4, but the present disclosure is not limited thereto.

Further, there are an upper space S1 between the first upper side U1 and the second upper side U2, a lower space S2 between the first lower side D1 and the second lower side D2, a left space S3 between the first left side L1 and the second left side L2, and a right space S4 between the first right side R1 and the second right side R2, wherein in this embodiment, the upper space S1 and the lower spacer S2 are equal, and the left space S3 and the right space S4 are equal. At this time, the center of the focus area F and the center of the initial image V1 are aligned with each other; however, the present disclosure is not limited thereto. For example, the upper space S1 and the lower space S2 are not equal, and the left space S3 and the right space S4 are not equal. At this time, the center of the focus area F and the center of the initial image V1 are not aligned with each other, and this is also within the scope of the present disclosure.

Figure 5:
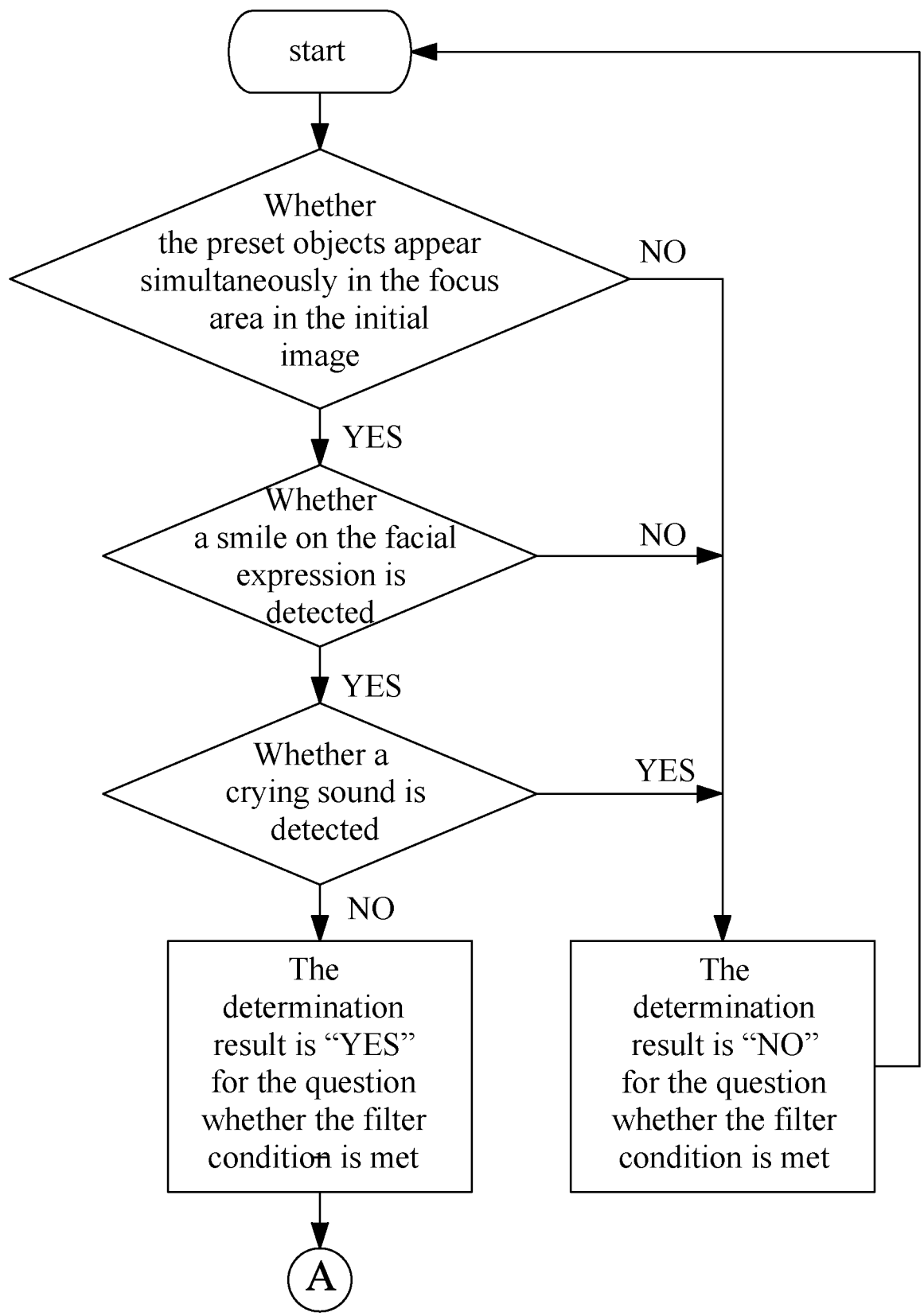
FIG. 5 is a block diagram showing the identification of the filter condition according to an embodiment of the present disclosure.

In an embodiment, the filter condition further includes the initial image V1 at least having a face of the infant P1 and an ambient volume measured from the infant P1 which is within a volume range. Further, the filter condition includes whether a smile on the infant's face is detected, and whether the infant's cry is detected. In the case that one or more preset objects appear in the focus area F of the initial image V1, if a smile on the infant's face is detected (the determination result is "YES") and no cry is detected (the determination result is "NO"), then the filter condition is met (the determination result is "YES"). In the case that one or more preset objects appear in the focus area F of the initial image V1, if no smile on the infant's face is detected (the determination result is "NO") or a cry is detected (the determination result is "YES"), then the filter condition is not met (the determination result is "NO") (as shown in FIG. 5).

As shown in FIG. 6, which shows a screen 201 displaying the background of the electronic device 200, wherein the viewing angle, the ambient volume, whether the infant is in the scene, the type of the preset object (adult/infant), facial expressions (such as smiles), and events (whether there is crying) are parameters as listed (the values are indicative only).

Figure 7:
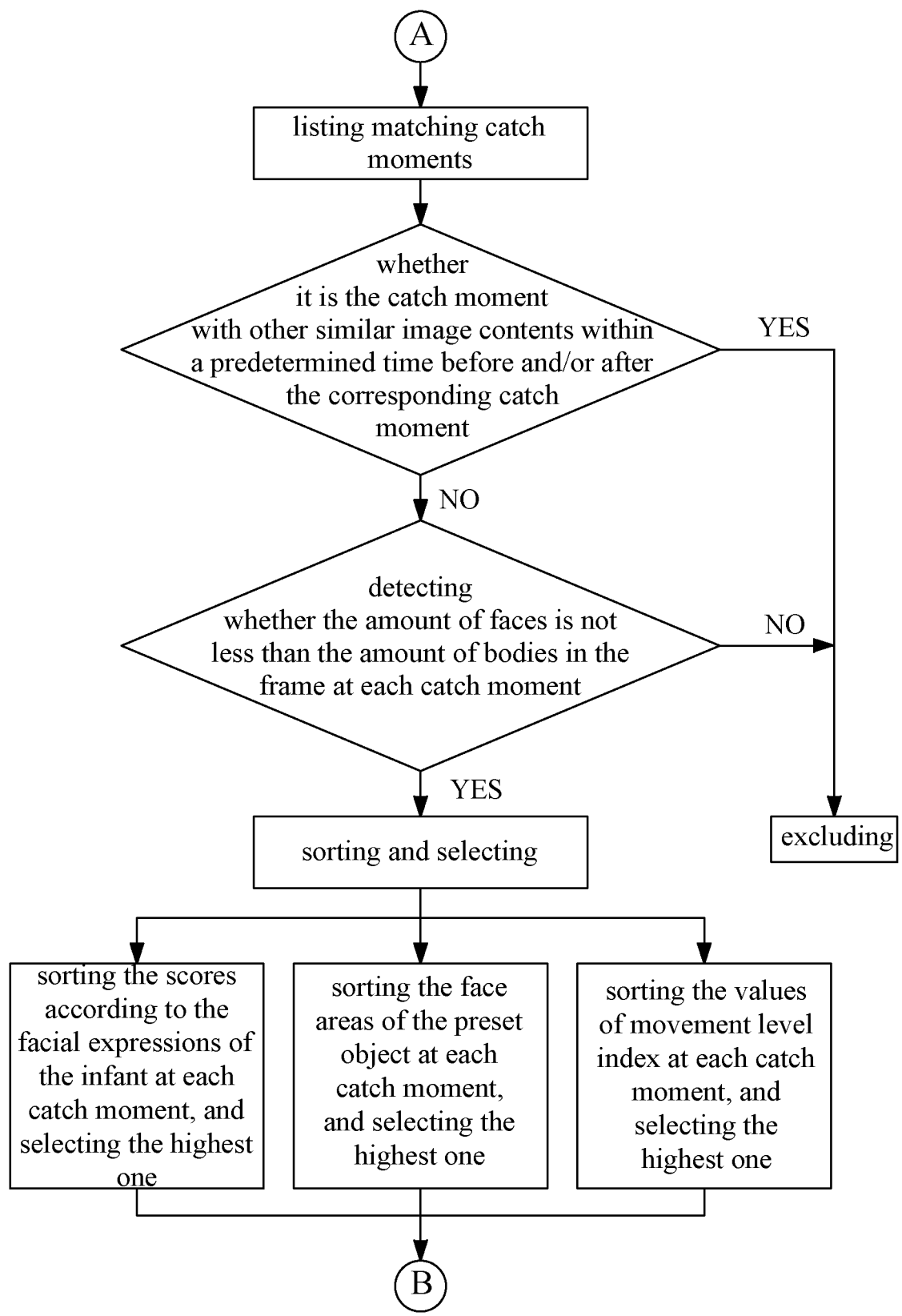
FIG. 7 is a block diagram showing selectin of the catch moment according to an embodiment of the present disclosure.

Further, in the step 102 of image filtering, based on the catch moment at which the video clip is selected, similar videos at other catch moments within a predetermined time before and/or after the catch moment are set to be excluded, referring to FIG. 7. For example, the predetermined time is in a range from 30 seconds to 2 minutes. In the case that the predetermined time is 1 minute, then within 1 minute before and/or after the catch moment, even if there are images which meet the filter condition, they are set to be excluded and not selected.

In an embodiment, if the preset object is at least one infant P1 and at least one adult P2, the filter condition further includes calculating an amount of faces Y and an amount of bodies B of the infant P1 in the initial image V1, and an amount of faces X and an amount of bodies B of the adult in the initial image V1. Further, it is detected that the amount of the faces of the infant P1 and the adult P2 is not less than the amount of the bodies of the infant P1 and the adult P2.

In the detection of faces and bodies of the infant and the adult, according to the screen 201 shown in FIG. 8 (also referring to the following Table 1A and Table 1B) which show the data listed at the reference time 03:52:13, the coordinate points x1, y1, x2, y2 being {1416,29,1455,96}, and the confidence value score being 0.65, the face X of the infant is detected and determined. Further, based on the coordinate points x1, y1, x2, y2 being {1203,695,1497,825} and the confidence value score being 0.58, the face Y of the adult is detected and determined. At the same time, the coordinate points x1, y1, x2, y2 of the body C and the face Z are all {0,0,0,0}, and the confidence score is also 0.

TABLE 1A (The right side of Table 1A is connected to the left side of Table 1B.)

| Basic information | | | | | | | [Body A] score and position | | | | | [Body B] score and position | | | | | [Body C] score and position | | | | |
| --- | --- | --- | --- | --- | --- | --- | --- | --- | --- | --- | --- | --- | --- | --- | --- | --- | --- | --- | --- | --- | --- |
| date | time | MLI | MPI | db | smile | cry | score | x1 | y1 | x2 | y2 | score | x1 | y1 | x2 | y2 | score | x1 | y1 | x2 | y2 |
| xxxx/xx/xx | 03:52:13 | 0.15 | 0.3 | 72.74 | 0.93 | 0 | 0.98 | 1461 | 4 | 1896 | 450 | 0.52 | 1203 | 695 | 1497 | 825 | 0 | 0 | 0 | 0 | 0 |
| xxxx/xx/xx | 03:52:19 | 0.16 | 0.09 | 72.74 | 0 | 0 | 0.95 | 1437 | 2 | 1878 | 441 | 0.62 | 1356 | 11 | 1560 | 411 | 0.51 | 1200 | 695 | 1494 | 825 |
| xxxx/xx/xx | 03:52:21 | 0.25 | 0.11 | 72.74 | 1 | 0 | 0.97 | 1413 | 2 | 1758 | 450 | 0 | 0 | 0 | 0 | 0 | 0 | 0 | 0 | 0 | 0 |
| xxxx/xx/xx | 03:54:33 | 0.2 | 0.17 | 72.74 | 0 | 0 | 0.96 | 1446 | 0 | 1770 | 447 | 0.94 | 1338 | 31 | 1539 | 360 | 0.56 | 1203 | 699 | 1497 | 828 |
| xxxx/xx/xx | 03:54:45 | 0.17 | 0.18 | 72.74 | 1 | 0 | 0.97 | 1383 | 4 | 1761 | 452 | 0.51 | 1203 | 697 | 1497 | 825 | 0 | 0 | 0 | 0 | 0 |

TABLE 1B

| [Face X] score and position | | | | | [Face Y] score and position | | | | | [Face Z] score and position | | | | | amount | | |
| --- | --- | --- | --- | --- | --- | --- | --- | --- | --- | --- | --- | --- | --- | --- | --- | --- | --- |
| score | x1 | y1 | x2 | y2 | score | x1 | y1 | x2 | y2 | score | x1 | y1 | x2 | y2 | Infant body | Adult body | face |
| 0.65 | 1416 | 29 | 1455 | 96 | 0.58 | 1674 | 9 | 1758 | 78 | 0 | 0 | 0 | 0 | 0 | 1 | 1 | 2 |
| 0.62 | 1461 | 22 | 1506 | 76 | 0.6 | 1677 | 9 | 1758 | 78 | 0.29 | 1434 | 36 | 1485 | 103 | 1 | 2 | 3 |
| 0.74 | 1452 | 33 | 1491 | 90 | 0.56 | 1650 | 6 | 1707 | 92 | 0 | 0 | 0 | 0 | 0 | 1 | 0 | 2 |
| 0.73 | 1434 | 49 | 1479 | 105 | 0.56 | 1647 | 11 | 1698 | 90 | 0 | 0 | 0 | 0 | 0 | 2 | 1 | 2 |
| 0.89 | 1431 | 33 | 1473 | 90 | 0.79 | 1641 | 2 | 1704 | 85 | 0 | 0 | 0 | 0 | 0 | 1 | 1 | 2 |

Based on the above, according to the data listed at 03:52:13, it shows that the number of faces of the infant P1 and the number of faces of the adult P2 detected are 1, respectively, and the number of bodies of the infant P1 and the number of bodies of the adult P2 detected are 1, respectively. Thus, the number of faces of the infant P1 and the adult P2 is 2 which is equal to the number of bodies of the infant P1 and the adult P2. The filter condition is met, and the faces of the infant P1 and the adult P2 appear simultaneously in the focus area F in the initial image V1. At this time, the determination result is "YES" for the question whether the filter condition is met in FIG. 5, and the determination result is "YES" for the question whether the number of human faces is not less than the number of the bodies, such that the image is selected.

Based on FIG. 9, Table 1A and Table 1B, according to the data listed at 03:52:21, the same detection of faces and bodies of the infant and the adult as that in FIG. 8 is performed to obtain the result that the number of faces of the infant P1 and the number of faces of the adult P2 detected in the initial image V1 are 1, respectively, the number of bodies of the infant P1 is 1, and the number of bodies of the adult P2 detected is 0. However, the number of faces of the infant P1 and the adult P2 being 2 is greater than the number of bodies of the infant P1 and the adult P2 being 1, but when identifying whether the filter condition is met in FIG. 5, the determination result is "NO" since the face of the adult P2 is not present in the focus area F of the initial image V1. There is no need to identify whether the number of human faces is not less than the number of bodies in FIG. 7, so as to be excluded. Therefore, when there are two or more preset objects, only the image with the face of each person in the focus area F will be selected. No image with the body but no face of someone will be selected. Also, no image with the face at the edge or the corner will be selected.

Figure 10:
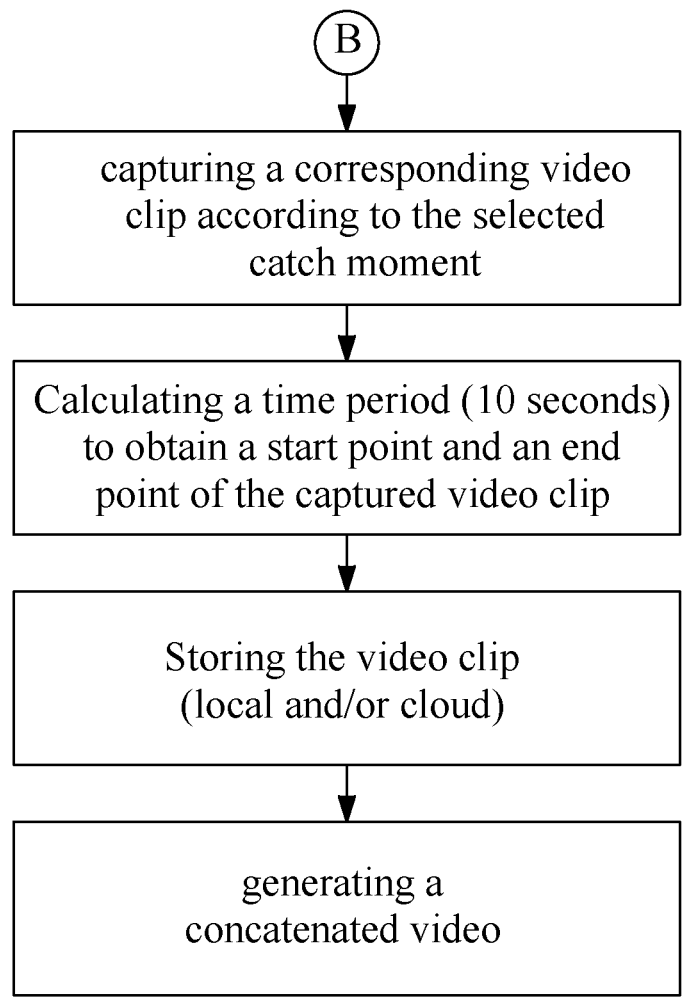
FIG. 10 is a block diagram showing the generation of the concatenated video from the video clips according to an embodiment of the present disclosure.

In the step 103 of concatenating videos, a least one video clip V2 in the initial image V1 is selected according to the catch moment, and the at least one video clip V2 is assembled to form the concatenated video V3 (shown in FIG. 10).

In an embodiment, in the step 103 of concatenating videos, a start point of the video clip V2 is set at a first time point which is a time period before the catch moment, and/or an end point of the video clip V2 is set at a second time point which is the time period after the catch moment. In an embodiment, in the case that the time period is 5 seconds, the length of the video clip is 10 seconds from the start point (which is 5 seconds forward from the catch moment) to the end point (which is 5 second afterward from the catch moment).

Further, in the selection of the video clip V2, the scores are sorted according to the facial expressions of the infant P1 at each catch moment, and the highest one is selected. Alternatively, the face areas of the preset object at each catch moment are sorted, and the highest one is selected. In the case that the scores are sorted according to the facial expressions of the infant P1 at each catch moment, taking a smile as an example, when the infant's facial expression is a smile, the score is assumed to be 0.3, but when the infant's facial expression is a big laugh, the score is assumed to be 1. The scores are sorted and the highest one is selected. In the case that the face areas of the preset object at each catch moment are sorted, the highest one is selected. Hence, at the selected catch moment, the person not only with a smile but also with a big laugh is selected. It can also be a person with the largest face area in addition to the facial expression.

In an embodiment, there are multiple catch moments, multiple video clips V2 captured at the multiple catch moments are stored in the local database of the electronic device 200 and/or a cloud database, and the multiple video clips V2 are concatenated to form a concatenated video V3.

In an embodiment, the database 500 further includes an intelligent body identification sub-database 501, an intelligent face identification sub-database 502, an intelligent crying sound identification sub-database 503, and/or an intelligent smile identification sub-database 504. The intelligent body identification sub-database 501 is used for identifying a body B of the infant P1, the intelligent face identification sub-database 502 is used for identifying a face Y of the infant P1, the intelligent crying sound identification sub-database 503 is used for identifying a crying sound of the infant P1, and/or the intelligent smile identification sub-database 504 is used for identifying a smile of the infant P1.

The terminal device 300 can be a portable mobile communication device, for example, a smart phone, a tablet or a laptop, to communicate with the wireless communication unit 20 of the electronic device 200 via the Internet. A user interface 301 is used for displaying one or more concatenated videos V3 (as shown in FIG. 11). The concatenated video V3 is assemble and generated from one or more video clips V2 stored in the cloud database. The video clip V2 is selected according to the catch moment, the catch moment is selected when the preset object in the initial image V1 meets the filter condition, and the filter condition includes that two or more preset objects appear simultaneously in the focus area F in the initial image V1. The terminal device 300 carries an application program 302, and the terminal device 300 executes the application program 302 and performs an identification procedure (for example, login an account with a password) to receive a push broadcast of the concatenated video V3 from the electronic device 200 (shown in FIG. 11). The user can watch the concatenated video V3 through the terminal device 300.

The features of the present disclosure are illustrated as follows.

1. In the dynamic image processing method and the electronic device, the filter condition includes that the preset object appears in the focus area in the initial image V1. When the filter condition is met, a catch moment is selected. In the concatenated video V3 generated from the video clips V2 captured at the catch moments, one or more preset objects can be presented in a relatively uniform proportion in the screen, and no face of the preset object is outside the focus area F, such that the concatenated video V3 generated from the video clips V2 can meet the user's expectation. Further, the concatenated video V3 can be pushed and broadcasted to the terminal device 300 in communication with the electronic device, and can be played by the terminal device 300.

2. In the dynamic image processing method and the electronic device, sorting and filtering can be performed according to the level of filter condition, so as to select the high level or the low level from the filter condition, so that the generated concatenated video V3 can better meet the user's expectation.

While the present disclosure has been described by means of preferable embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A dynamic image processing method, which is executed by an electronic device communicating with a photographing device and reading an executable code to identify a preset object by using artificial intelligence, and perform dynamic image processing for the preset object, the dynamic image processing method comprising the following steps of:
   identifying the preset object, wherein the preset object is recognized by artificial intelligence from an initial image captured by the photographing device;
   image filtering, wherein a filter condition is set, the filter condition includes that the preset object appears in a focus area of the initial image, and when the preset object in the initial image meets the filter condition, a catch moment in the initial image is selected; and
   forming a concatenated video, wherein at least one video clip in the initial image is selected according to the catch moment, and the at least one video clip is assembled to form the concatenated video,
   wherein the preset object includes at least one infant and at least one adult, the filter condition further includes calculating an amount of faces of the infant and the adult and an amount of bodies of the infant and the adult, and the filter condition further includes the amount of the faces of the infant and the adult being not less than the amount of the bodies of the infant and the adult.

2. The dynamic image processing method according to claim 1, wherein in the step of image filtering, based on the catch moment at which the video clip is selected, similar videos at other catch moments within a predetermined time before and/or after the catch moment are set to be excluded.

3. The dynamic image processing method according to claim 1, wherein the filter condition further includes an ambient volume measured from the infant, and the filtering condition further includes that the ambient volume is within a volume range.

4. The dynamic image processing method according to claim 1, wherein the video clip is selected based on a score of the infant's facial expression at the catch moment, and a highest score is selected; or the video clip is selected based on a face area of the preset object at the catch moment, and a largest face area is selected.

5. The dynamic image processing method according to claim 1, wherein in the step of forming the concatenated video, a start point of the video clip is set at a first time point which is a time period before the catch moment, and/or an end point of the video clip is set at a second time point which is the time period after the catch moment.

6. The dynamic image processing method according to claim 5, wherein there are multiple catch moments, multiple video clips respectively selected at the multiple catch moments are stored in the electronic device and/or a cloud database, and the multiple video clips are concatenated into the concatenated video.

7. The dynamic image processing method according to claim 1, wherein an entire screen of the initial image is a rectangle including a first upper side, a first lower side, a first left side, a first right side, a first width between the first upper side and the first lower side, and a second width between the first left side and the first right side; and the focus area is a rectangular preset area smaller than the entire screen of the initial image, the rectangular preset area includes a second upper side, a second lower side, a second left side, a second right side, a third width between the second upper side and the second lower side, and a fourth width between the second left side and the second right side are, wherein the first width is greater than the third width, and the second width is greater than the fourth width.

8. The dynamic image processing method according to claim 7, comprising an upper space between the first upper side and the second upper side, a lower space between the first lower side and a second lower side, a left space between the first left side and the second left side, and a right space between the first right side and the second right side, wherein the upper space and the lower space are equal or unequal, and the left space and the right space are equal or unequal.

9. A terminal device for communicating with an electronic device that executes the method of claim 1, wherein the terminal device carries an application program, and the terminal device executes the application program to receive a push broadcast of the concatenated video from the electronic device.

10. An electronic device for processing dynamic images, in which the electronic device communicates with a photographing device and a database, the database receives an initial image captured by the photographing device and uses artificial intelligence to identify a preset object, and the electronic device performs dynamic image processing on the preset object, the electronic device comprising:

an intelligent processing unit, electrically connected to the photographing device or the database for reading the initial image and reading and executing an executable code to set a filter condition for selecting a catch moment in the initial image when a threshold is met, wherein the filter condition includes that the preset object appears in a focus area of the initial image, the focus area is smaller than a rectangular preset area of an entire screen of the initial image, and the intelligent processing unit selects at least one video clip according to the catch moment and assembles the at least one video clip to form a concatenated video, wherein the preset object includes at least one infant and at least one adult, the filter condition further includes calculating an amount of faces of the infant and the adult and an amount of bodies of the infant and the adult, and the filter condition further includes the amount of the faces of the infant and the adult being not less than the amount of the bodies of the infant and the adult.

11. The electronic device for processing dynamic images according to claim 10, wherein the database is a local database and/or a cloud database to which the electronic device belongs.

12. The electronic device for processing dynamic images according to claim 11, wherein the preset object at least includes an infant, and the database further includes an intelligent body identification sub-database for identifying a body of the infant, an intelligent face identification sub-database for identifying a face of the infant, an intelligent crying sound identification sub-database for identifying a crying sound of the infant, and/or an intelligent smile identification sub-database for identifying a smile of the infant.

13. A mobile communication device for communicating with a photographing device and a cloud database, the mobile communication device includes a user interface for displaying at least one concatenated video, the concatenated video is assembled from the at least one video clip stored in the cloud database, the video clip is selected according to a catch moment, the catch moment is selected when the preset object in an initial image meets a filter condition, and the filter condition includes that at least two preset objects simultaneously appear in a focus area in the initial image, wherein the preset object includes at least one infant and at least one adult, the filter condition further includes calculating an amount of faces of the infant and the adult and an amount of bodies of the infant and the adult, and the filter condition further includes the amount of the faces of the infant and the adult being not less than the amount of the bodies of the infant and the adult.

* * * * *